United States Patent
Slater et al.

(10) Patent No.: US 7,028,193 B1
(45) Date of Patent: Apr. 11, 2006

(54) METHOD AND APPARATUS FOR DETERMINING THE VALIDITY OF A DATA PROCESSING TRANSACTION

(75) Inventors: Robin John Slater, Dundee (GB); Kenneth J. Peters, Dundee (GB)

(73) Assignee: NCR Corporation, Dayton, OH (US)

( * ) Notice: Subject to any disclaimer, the term of this patent is extended or adjusted under 35 U.S.C. 154(b) by 990 days.

(21) Appl. No.: 09/020,699

(22) Filed: Feb. 9, 1998

(30) Foreign Application Priority Data

May 24, 1997 (GB) .................................... 9710720

(51) Int. Cl.
*H04L 9/00* (2006.01)

(52) U.S. Cl. ................... 713/185; 713/182; 713/184; 705/18; 705/43; 705/44; 902/11; 902/25; 902/26; 902/27

(58) Field of Classification Search ................ 705/18, 705/43, 44; 395/186, 187.01, 188.01; 902/20, 902/11, 25, 26, 27; 235/382, 493, 487, 479, 235/480, 380; 713/182, 184, 185
See application file for complete search history.

(56) References Cited

U.S. PATENT DOCUMENTS

| | | | |
|---|---|---|---|
| 3,786,421 A | | 1/1974 | Wostl et al. |
| 4,578,567 A | * | 3/1986 | Granzow et al. ........... 235/380 |
| 4,801,787 A | | 1/1989 | Suzuki |
| 5,644,728 A | * | 7/1997 | Pillans ....................... 395/243 |
| 5,648,648 A | * | 7/1997 | Chou et al. ................ 235/382 |
| 5,859,416 A | * | 1/1999 | Gatto ......................... 235/384 |
| 5,883,377 A | * | 3/1999 | Chapin, Jr. ................ 235/493 |

FOREIGN PATENT DOCUMENTS

GB       2199681 A   *   7/1988

OTHER PUBLICATIONS

"In your pocket: Smartcards" by C. H. Fancher, IEEE Spectrum, New York, Feb. 1997, vol. 34, Iss.2, p. 47, abstract only.*

* cited by examiner

*Primary Examiner*—Reba I. Elmore
(74) *Attorney, Agent, or Firm*—Gregory A. Welte

(57) ABSTRACT

The present invention relates to determining the validity of a transaction of a data processing system such as the validity of a financial transaction carried out at an automatic teller machine (10) which has a magnetic card reader. In addition to the entry of a PIN, a user of the system is requested to enter personal information that has been nominated by the user and may consist of a date of birth and a telephone number. A keypad (16) allows the user to enter the PIN. The user is also requested to enter digits from the personal information to be checked against stored security data so that the level of security can be enhanced. A data processing unit of the system is programmed to cause further requests for digits from the personal information in the event that errors are made in the data entry.

19 Claims, 5 Drawing Sheets

| REQUEST 1 | SUCCESS | RESULT | REQUEST 2 | SUCCESS | RESULT | REQUEST 3 | SUCCESS | RESULT |
|---|---|---|---|---|---|---|---|---|
| PIN +D0 | Y+Y | PROCEED | | | | | | |
| | Y+N | | PIN +D0 +D1 +D2 | Y +Y +Y +Y | PROCEED | | | |
| | | | | 3Y +N | | PIN +D0 +D1 +D2 +ALL P | ALL Y | PROCEED |
| | | | | | | | ANY N | VALIDATE |
| | | | | 2Y + 2N 1Y + 3N 4N | VALIDATE | | | |

FIG. 4

| REQUEST 1 | SUCCESS | REQUEST 2 | SUCCESS | RESULT | REQUEST 3 | SUCCESS | RESULT |
|---|---|---|---|---|---|---|---|
| PIN +D0 | Y+N N+Y | PIN +D0 +PX +PY | 4Y | PROCEED | | | |
| | | | Y+Y+Y+N Y+Y+N+Y N+Y+Y+Y | | PIN +D0 +ALL P | ALL Y | PROCEED |
| | | | | | | ANY N | VALIDATE |
| | | | Y+N+Y+Y | | PIN +D0 +D1 +D2 +PX +PY | ALL Y | PROCEED |
| | | | | | | ANY N | VALIDATE |
| | | | 2Y+2N 1Y+3N 4N | VALIDATE | | | |

METHOD AND APPARATUS FOR DETERMINING THE VALIDITY OF A DATA PROCESSING TRANSACTION

BACKGROUND OF THE INVENTION

The present invention relates to a method and apparatus for determining the validity of a data processing transaction. The invention is of particular advantage in checking the validity of a financial transaction conducted at an automatic teller machine (ATM) which has a card reader and means to enter a PIN (personal identification number).

It is conventional in an ATM to provide for an identification card to be entered and the PIN of the authorized card holder to be checked upon entry by the card holder of the PIN through a keypad of the ATM. If the PIN is entered incorrectly, the user may be allowed up to 3 attempts, and a failure to enter the correct PIN at this point may result in the capture of the card by the ATM. A PIN provides substantial security against fraudulent misuse of a card by an unauthorized user of the card, but the ATM may still not protect against misuse by an unauthorized user who may guess the PIN or who may have had access to the PIN.

SUMMARY OF THE INVENTION

It is an object of the invention to increase the level of security against fraudulent use of an identification card in an ATM, for the benefit of the authorized card holder and the operator of the ATM.

According to one aspect of the present invention, there is provided a method of determining the validity of a transaction of a data processing system which includes a manual data entry means, the method including the steps of receiving a first entry of data through the manual data entry means, and checking data entered in the first entry against a first stored field of security data, characterized by the further steps of receiving a second entry of data through said manual data entry means, and checking the data entered in the second entry against a second stored field of security data.

According to a second aspect of the present invention, there is provided a data processing system for carrying out a transaction requested by a user of the system, including a data processing unit, manual data entry means, and communication means for communicating information to a user of the system, said communication means being arranged, under the control of said data processing unit, to request a first entry of data from said data entry means, and said data processing unit being arranged to check data entered in response to the first request against a first stored field of security data, characterized in that said communication means is arranged, under the control of said data processing unit, to request a second entry of data from said data entry means, and said data processing unit is arranged to check data entered in response to the second request against a second stored field of security data, the validity of a requested transaction being determined by the results of the checks made of the data entered in response to the first and second requests.

Preferably, one of the entries of data is a PIN, and the other entry of data is data personal to a holder of the card. The personal data may relate, for example, to a date of birth and/or to a telephone number.

BRIEF DESCRIPTION OF THE DRAWINGS

The invention will now be described, by way of example, with reference to the accompanying drawings, in which:

FIGS. 3, 4 and 5 are explanatory diagrams relating to the operation of the ATM of FIGS. 1 and 2.

DETAILED DESCRIPTION

Figure 1:
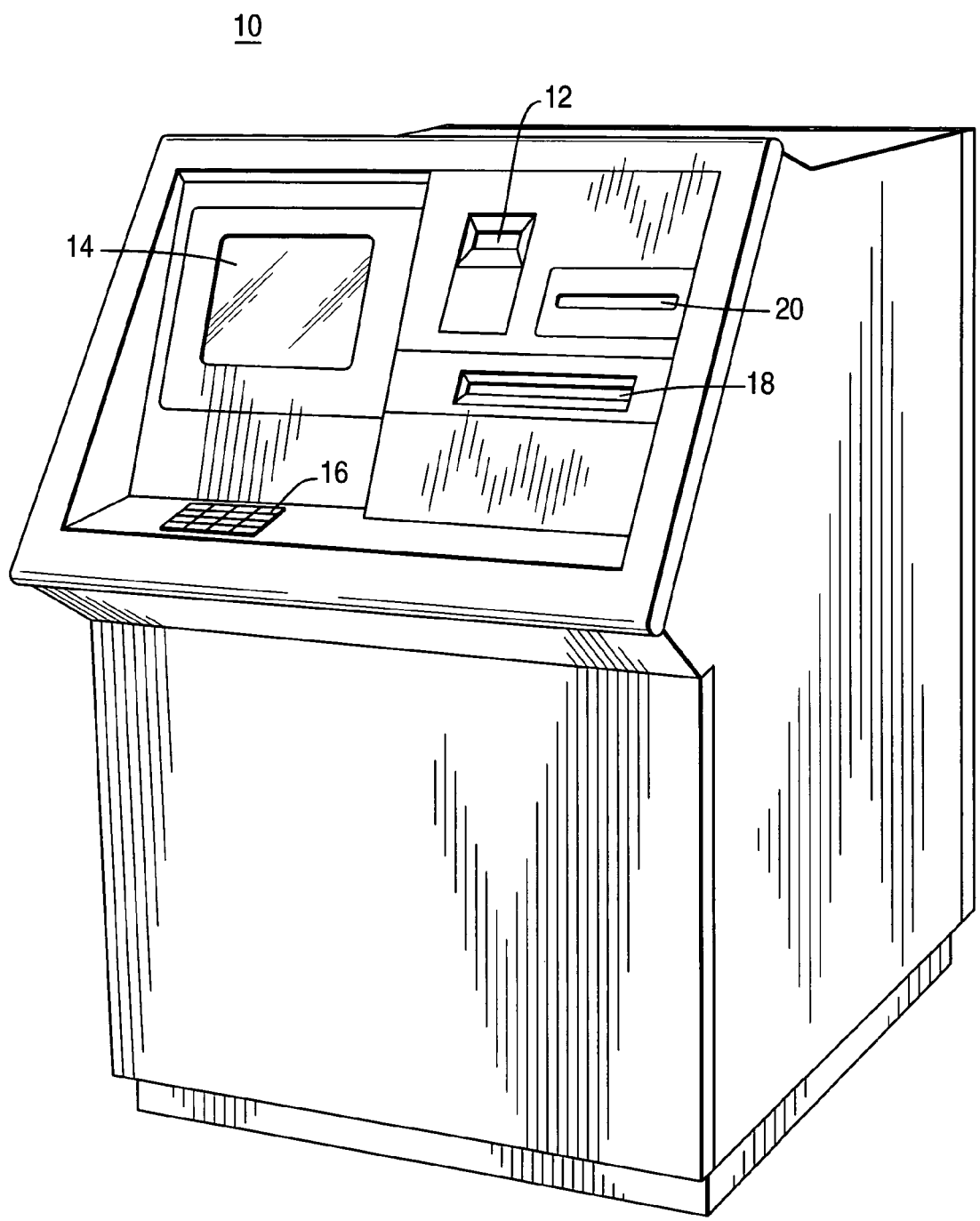
FIG. 1 is a perspective view of an ATM according to the present invention.

In FIG. 1 there is shown an ATM 10 which includes a magnetic card reader slot 12, a visual display device 14 for communicating information to a user of the ATM 10, and a keypad 16. The ATM 10 also includes a cash dispenser slot 18 and a printer slot 20.

Figure 2:
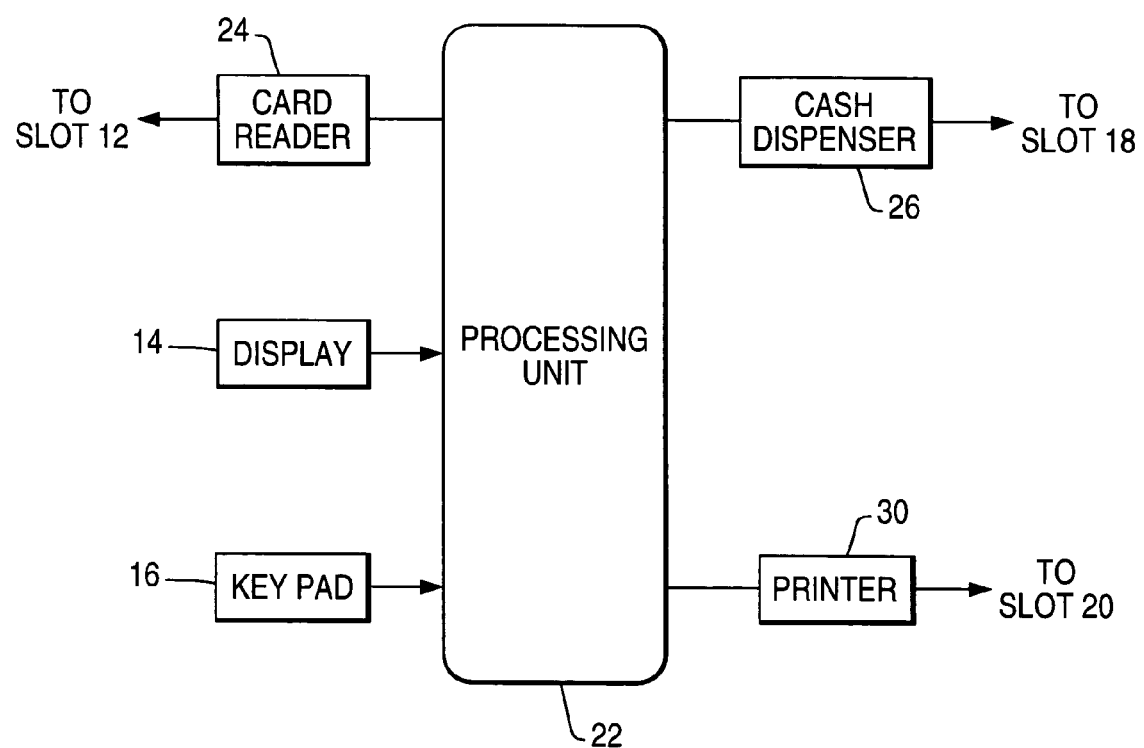
FIG. 2 shows a block circuit diagram of components included in the ATM of FIG. 1.

Referring now to FIG. 2, the ATM 10 includes a data processing unit 22, a card reader 24 communicating with the slot 12, a cash dispenser 26 communicating with the slot 18, and a printer 30 communicating with the slot 20.

The data processing unit 22 incorporates a memory to register data entered into the ATM 10 by way of the keypad 16 and the card reader 24. The memory also stores programs to enable the processing unit 22 to provide the functions of displaying information to the user of the ATM 10 and to control the various operations required in the functioning of the ATM 10, including, for example, checking the validity of transactions, dispensing cash, or capturing a card entered into the card reader 24, as will be explained.

Upon entry of a user's identification card (magnetic stripe card) into the card reader slot 12, the processing unit 22 causes the display 14 to display a message which requests the user to enter his PIN. The processing unit 22 is also programmed to read magnetically recorded information from the card and to register that information in the memory of the processing unit 22. The information read from the card includes information identifying the authorized holder of the card. The information read from the card also includes the encrypted PIN which is located on one track of the card, and further encrypted personal digital information that is recorded on another track of the card. The personal information is information that has been nominated by the holder of the card and includes a date (e.g. the holder's date of birth) and digits from a telephone number. The personal information which is nominated consists of digits which may easily be remembered by the authorized holder of the card but would be difficult for a fraudulent user to discover. The telephone number need not be the personal number of the authorized holder but could be any telephone number which the authorized holder can easily remember. The information recorded magnetically on the card can thus be considered to include PIN digits in a first field of security data and personal information digits in a second field of security data. As already indicated, the recording of data on the card is protected by encryption.

Upon entry of a card into the card reader slot 12, which entry serves to initiate a transaction to be requested by the user, the data recorded on the card is read and decrypted. The display 14 is then used to display a request to the card user to enter the PIN through the keypad 16. Following entry of the PIN, the user is requested, by way of the display 14, to enter two or more digits selected from the second field of security data on the card. The digits which are requested may be in a specific order which may not be sequential; for example the request may be for the third and first digits of the nominated telephone number in that order. The processing unit 22 is programmed to record which digits from the second field are requested of the card user.

Upon a subsequent use of the card, the procedure of checking is undertaken as before but the digits which are requested from the second field of security data are different. For example, for one time of use of the card, two digits are requested from the telephone number, while on a the next occasion the digits may be requested from the date of birth. The purpose of recording which digits have been requested of the card user is to enable the processing unit 22 to change the request following each occasion of use of the card. The processing unit 22 is programmed to initiate a series of requests for different selections of digits from the second field of data. Thus the digits from the date of birth may on one occasion represent the day of birth, the digits on a second occasion may represent the month of birth and the digits on a third occasion may represent the year of birth. On further occasions the digits may be requested at random from the telephone number.

If the user correctly enters data in response to both requests for entry of data, then the user is permitted to proceed with a transaction requested by the user at the ATM 10, such as the withdrawal of cash.

The processing unit 22 is programmed to ascertain, from an incorrect entry of requested digits, how closely the actual entry is to the correct entry. The response of the processing unit 22 is thereby made variable in dependence upon the entry of digits through the keypad 16. If the response to a request for the PIN and two digits of personal data is incorrect, the processor 22 is programmed to initiate a further request. The further request may depend on the degree of accuracy of the response to the first request. The next request may include a demand for further digits of personal information to discriminate between a legitimate user who made a simple keying error and a fraudulent user who is guessing at the correct entry and needs to be checked further.

A failure to make a correct entry in response to some requests initiated by the processing unit 22 causes the processing unit 22 to terminate the transaction process and to control the card reader 24 to capture the card. Such a request is referred to herein as a final request. A final request may be presented to the user after one or more previous failed attempts at entry of digits through the keypad 16. If a second failed attempt is close enough to the correct entry that the user may still be regarded as possibly the legitimate user, a further attempt may be allowed. A failed attempt at a final request will result in a requirement for full validation. Full validation involves termination of the transaction process, capture of the card, and notification to the user and to the bank that there is a potential illegal use of the card which may be resolved by the bank or the user demonstrating that the user is genuine but has been unable to make a correct keypad entry for some valid reason.

A final request may occur after one previous failed attempt if the failed attempt is so far from a correct entry that the user is likely to be guessing the correct entry. A final request may be presented after two previous failed attempts provided the previous attempts are close enough to the correct entry to justify a third attempt.

Figure 3:
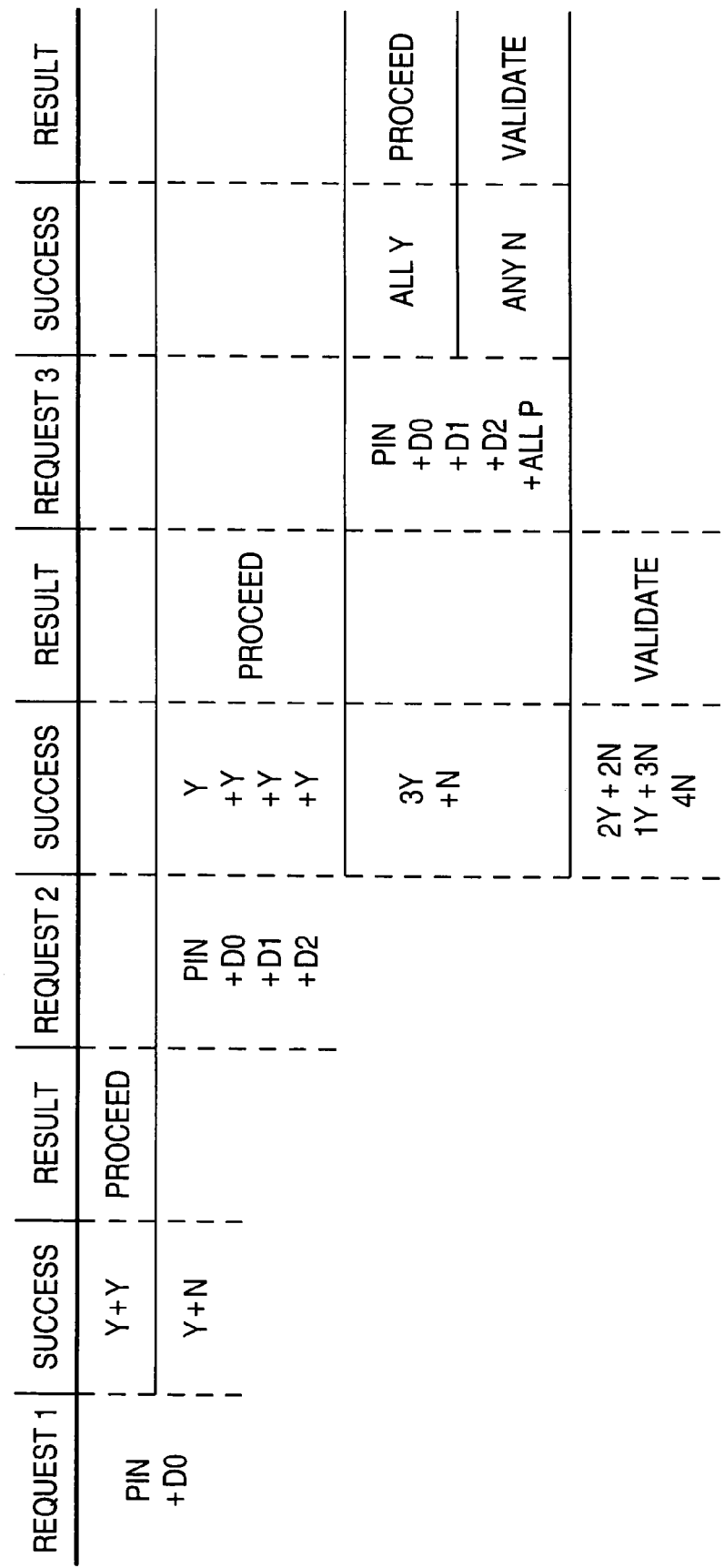

To illustrate a suitable hierarchy of requests in the ATM 10, reference will now be made to FIGS. 3, 4 and 5. Referring first to FIG. 3, a first request, Request 1 in the diagram, requires an input of the PIN and a data input D0. The data input may be selected from a date of birth represented, for example, as 12 02 65 for a date of 12 Feb. 1965. Thus D0 could be the digits 1 and 2, a second data input D1 could be the digits 0 and 2 and a third data input D2 could be the digits 6 and 5. A successful entry of the PIN or a personal data input is represented in the diagram by Y while an unsuccessful input is represented by N. If the entry of the PIN and the digits D0 was fully successful, the entry is represented by Y+Y as shown in the diagram. A fully successful entry results in the transaction being permitted to proceed and the data processing unit 22 records that the data field D0 was requested to be entered by the user.

If the response to the first request was only partly successful, as indicated by Y for the PIN and N for the data D0, a second level check is performed to determine if the incorrect entry D0 had the digits transposed or had digits equal to D1 or D2. For the hierarchy of requests illustrated in FIG. 3, it is assumed that the second level check had an affirmative result. Thus, the card holder made a correct entry of the PIN and so could be genuine, and the nature of the incorrect entry for D0 may also indicate this. To determine if the cardholder was confused with the date field, the second request is for the PIN and the full date of birth D0, D1 and D2. If the entry to the second request is fully successful, as indicated by Y+Y+Y+Y, the transaction is permitted to proceed and the data processing unit 22 records that the data fields D0, D1 and D2 were requested to be entered by the user.

If the entry to the second request was only partly successful and only one error was made, this is indicated by 3Y+N. In this event, the user is allowed a further attempt and is subject to Request 3 in which the user is requested to enter the PIN, the digits D0, D1, D2 and all the digits of the telephone number, P. A fully successful response to the third request, all Y, results in the transaction being permitted to proceed. If any of the data entries for the third request is wrong, any N, then full validation is required, which involves termination of the transaction.

If the attempt at the second request is to make two or more errors, 2Y+2N or 1Y+3N or 4N, the indication is that the use is likely to be invalid with the user guessing numbers. The result is to initiate a full validation procedure.

Turning now to FIG. 4, the attempt at the first request (for PIN and D0) is Y+N or N+Y. If the attempt is Y+N (PIN correct but D0 incorrect), it is assumed that a second level check indicates that the digits of D0 were not transposed and are not equal to D1 or D2. On this occasion, the second request is for the entry of the PIN, the digits D0 and two sets of telephone digits PX and PY (where PX and PY were not used in the previous transaction). If the attempt at the second request is fully correct as indicated by 4Y, the transaction is allowed to proceed and the processing unit 22 records that the data fields D0, PX and PY were used. If the attempt at the second request involves one error and that error is not in the data field D0, the user may be regarded as probably an authorized user and a third request is made for the PIN, the digits D0 and all the telephone number digits. If the result of that third request is fully correct, the transaction is permitted to proceed, but if any further error is made, a full validation procedure is initiated.

If the attempt made in response to the second request involves one error and that error is in D0, a third request is for the PIN, and the digits D0, D1, D2, PX and PY. If the result of this third request is fully correct, the transaction is permitted to proceed, but any error will result in a full validation procedure being initiated.

If the attempt made in response to the second request involves more than one error, the indication is of a high probability of an invalid transaction and accordingly a full validation procedure ensues.

In the hierarchy of requests shown in FIG. 4, the attempt at the first request may involve an incorrect PIN and a correct entry D0 (shown as N+y). This could indicate that the user may be someone who knows the date of birth but not the PIN. In this case the second and third requests in the hierarchy are the same as before, and the second request is seeking to check on a user who may know the date of birth but not the telephone number.

Figure 5:
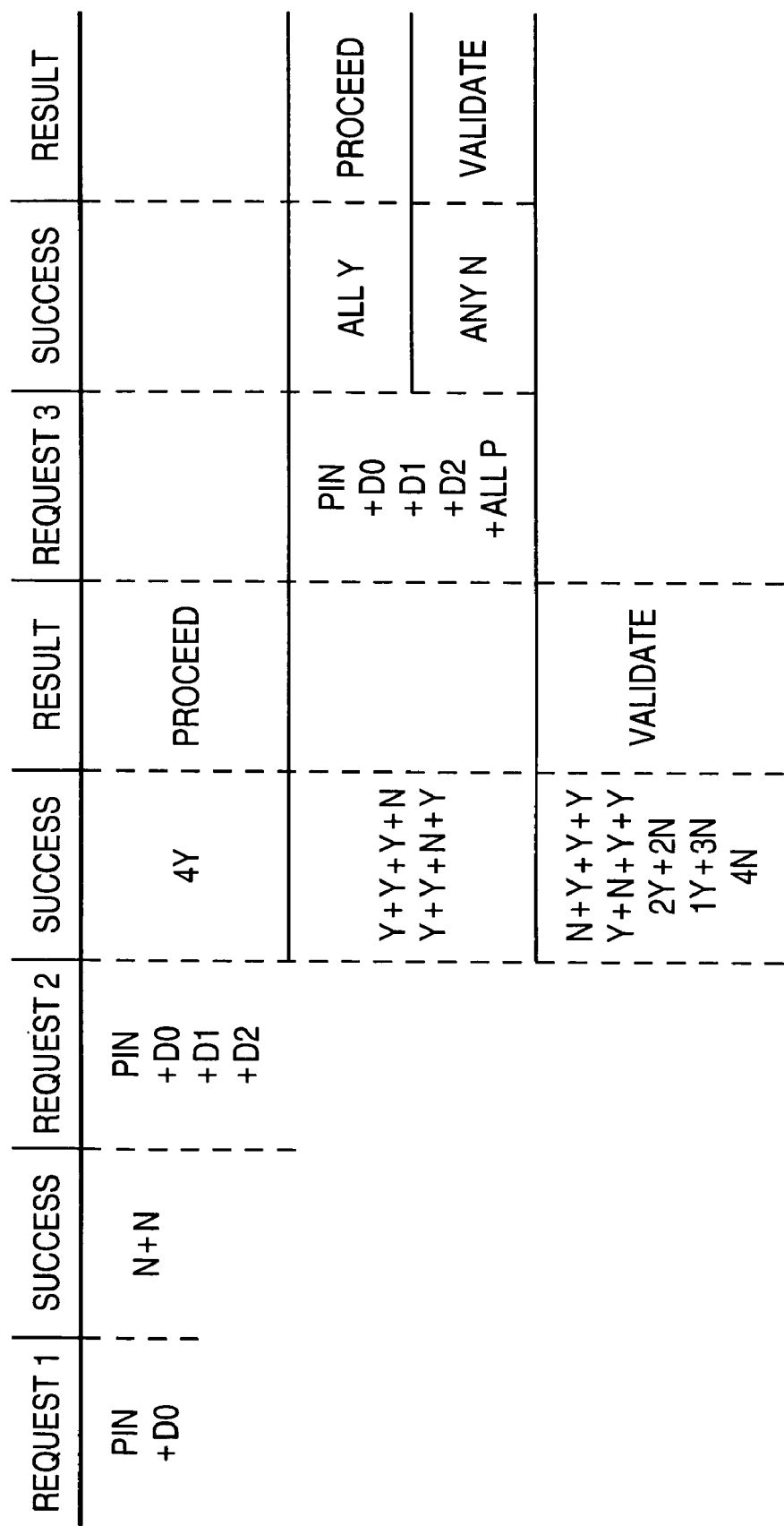

Turning now to FIG. 5, the first attempt is shown as being incorrect in relation to both the PIN and the digits D0. In this case the second request is for the PIN, and the digits D0, D1 and D2. If the second attempt is correct, the transaction is permitted to proceed. If the second attempt is correct as regards the PIN but involves an error in the digits D1 or D2, a third request is made for the PIN, the digits D0, D1, D2 and all the telephone digits P. A successful attempt at the third request will result in the transaction being permitted to proceed, but any digits in error will result in a full validation procedure being initiated.

If the attempt at the second request is to make an error in the PIN or in the digits D0, then a full validation procedure is immediately initiated. An attempt at the second request which results in making more than one error also results in a full validation procedure being initiated.

It will be appreciated that if, despite the enhanced level of security resulting from the procedures according to the present invention, a fraudulent transaction nevertheless takes place, this indicates that the perpetrator of the fraud knew more about the card holder than just the PIN. Thus, it should be easier to track down the perpetrator of the fraud than would have been the case if only possession of the card and knowledge of the PIN were required. For example, the perpetrator of the fraud could be a member of the card holder's family.

It should be understood that in alternative systems in accordance with the invention the PIN and/or the personal information for each user could be stored in a host computer, to which the processing unit 22 is connected, instead of on the user's identification card.

One form of the invention encompasses a method of determining validity of a transaction carried out by a user at a data processing system, the method including the steps of:
a) receiving a user identification card and a first entry of data from the user;
b) checking the first entry of data against a first stored field of security data;
c) issuing a message to the user which requests a subset entry, consisting of less than all characters of a second stored field of security data, and receiving the subset entry from the user;
d) checking the subset entry against the corresponding subset within the second stored field of security data;
e) determining the validity of the transaction based upon the results of the checks of steps (b) and (d); and
f) displaying the first and second entries of data after receiving the second entry of data.

What is claimed is:

1. A computerized method of determining validity of a transaction carried out by a user at a data processing system, the method including the steps of:
a) receiving a user identification card and a first entry of data from the user;
b) checking the first entry of data against a first stored field of security data;
c) issuing a message to the user which requests a subset entry, consisting of less than all characters of a second stored field of security data, and receiving the subset entry from the user;
d) checking the subset entry against the corresponding subset within the second stored field of security data; and
e) executing a computer program via the data processing system to determine the validity of the transaction based upon the results of the checks of steps (b) and (d).

2. A method according to claim 1, further comprising the step of: f) displaying the first and second entries of data after receiving the second entry of data.

3. A method according to claim 1, wherein one entry of data is a personal number (PIN) associated with the user identification card and the other entry of data is data personal to an authorized holder of the card.

4. A method according to claim 3, wherein at least one of the first and second stored fields of security data is stored on the user identification card.

5. A data processing system according to claim 4, wherein the data processing unit keeps a record of the requested second entry of data.

6. Method according to claim 1, wherein, at a later time, the user presents the identification card again, in connection with a different transaction, and method includes the step of
f) issuing a message requesting entry of a second subset entry, consisting of a different subset of said second stored field of security data.

7. A data processing system for carrying out a transaction by a user of the system, the data processing system comprising:
manual data entry means for allowing the user to enter data;
communication means for communicating information to the user;
a data processing unit for
(i) controlling the communication means to request a first entry of data from the user via the data entry means,
(ii) checking the first entry of data against a first stored field of security data,
(iii) controlling the communication means to request a second entry of data containing a specified subset of less than all digits of specified security data from the user via the data entry means,
(iv) checking the second entry of data against a subset of a second stored field of security data, and
(v) determining the validity of the transaction based upon results of the checks made of the first and second entries of data against the first and second stored fields of security data, respectively.

8. System according to claim 7, wherein the data processing unit, at one time, requests a specified subset A of digits of the security data, and, at another time, requests a specified subset B of digits of the same security data.

9. A data processing system according to claim 7, wherein the communication means includes visual display means for displaying the results of checking the first and second entries of data.

10. A data processing system according to claim 9, wherein the data processing unit causes the communication means for make at least one further request for data to be entered by the user through the data entry means when an incorrect entry of data is received, and then checks the data entered in response to the further request against stored security data.

11. A data processing system according to claim 10, wherein the nature of a further request for data is determined by the nature of the error or errors in the data previously received from the user via the data entry means.

12. A data processing system according to claim 10, further comprising a card reader for reading data from a user identification card inserted by the user into the card reader for the purpose of initiating a transaction.

13. A data processing system according to claim 12, wherein the data processing unit causes the card reader to capture the user identification card when an error in the data is received in response to a final request.

14. A data processing system according to claim 13, wherein the card reader reads at least one of the stored fields of security data from the user identification card.

15. A computerized method of validating identity of a party attempting to execute a transaction, comprising the following steps:
 a) accepting an identity card from the party;
 b) reading first and second data from the card;
 c) prior to asking for any other identity data, presenting a message asking the party to enter the first data; and
 d) executing a computer program to compare the first data entered with the first data read from the card and, if they agree, presenting a message asking the party to enter the second data; and
 e) executing the computer program to compare the second data entered with the second data read from the card and, if they agree, proceeding with the transaction.

16. Method according to claim 15, in which the first and second data are stored in the card in encrypted form.

17. Method according to claim 15 and, wherein lack of agreement between an entered data and a data read from the card suspends the transaction.

18. A computerized method of validating identity of a party attempting to execute a transaction, comprising the following steps:
 a) accepting an identity card from the party;
 b) reading first and second encrypted data from the card;
 c) presenting a message asking the party to enter the first data; and
 d) executing a computer program to compare the first data entered with the first data read from the card and, if they agree, presenting a message asking the party to enter the second data; and
 e) executing the computer program to compare the second data entered with the second data read from the card and, if they agree, proceeding with the transaction
 f) suspending the transaction if the second data entered fail to agree with data read from the card, and evaluating whether lack of agreement results from a keying error, or from guessing.

19. Method according to claim 18, wherein the step of evaluating whether lack of agreement results from a keying error, or from guessing, comprises the step of
 i) requesting further digits, and comparing the further digits with the second data read from the card.

* * * * *